United States Patent [19]

Nelson

[11] 4,115,177
[45] Sep. 19, 1978

[54] MANUFACTURE OF SOLAR REFLECTORS

[75] Inventor: David H. Nelson, Twentynine Palms, Calif.

[73] Assignees: Homer Van Dyke; Dave Van Dyke; Mark Dorian; George Lerg, ; part interest to each

[21] Appl. No.: 744,149

[22] Filed: Nov. 22, 1976

[51] Int. Cl.² .................... F24J 3/02; H01Q 15/14
[52] U.S. Cl. ..................... 156/245; 126/270; 343/912
[58] Field of Search ............... 156/242, 245; 29/600, 29/601; 126/270, 271; 343/832, 834, 837, 912, 914; 350/292, 293; 264/32, 34

[56] References Cited

U.S. PATENT DOCUMENTS

| | | | |
|---|---|---|---|
| 2,945,233 | 7/1960 | Wild et al. | 343/912 |
| 3,119,109 | 1/1964 | Miller et al. | 343/912 |
| 3,184,210 | 5/1965 | Fassnacht et al. | 343/912 |
| 3,536,800 | 10/1970 | Hubbard | 343/912 |
| 3,716,869 | 2/1973 | Gould et al. | 343/912 |
| 3,855,027 | 12/1974 | Erdmann et al. | 156/245 |
| 3,897,294 | 7/1975 | MacTurk | 156/245 |

*Primary Examiner*—Caleb Weston
*Attorney, Agent, or Firm*—Fulwider, Patton, Rieber, Lee & Utecht

[57] ABSTRACT

A tool is provided for manufacturing parabolic solar reflectors. The tool employs an improved smooth convex parabolic surface terminating in edges remote from the parabolic vertex which are preferably placed under elastic tension tending to draw the edges toward each other. The improved convex surface is a film of plastic coated with chromium metal on its exterior surface. A multiple layered thermosetting plastic reflector support is molded onto the convex surface of the tool. The reflector support is removed from the tool and a layer of aluminum is vacuum deposited onto the interior concave parabolic reflector surface.

11 Claims, 11 Drawing Figures

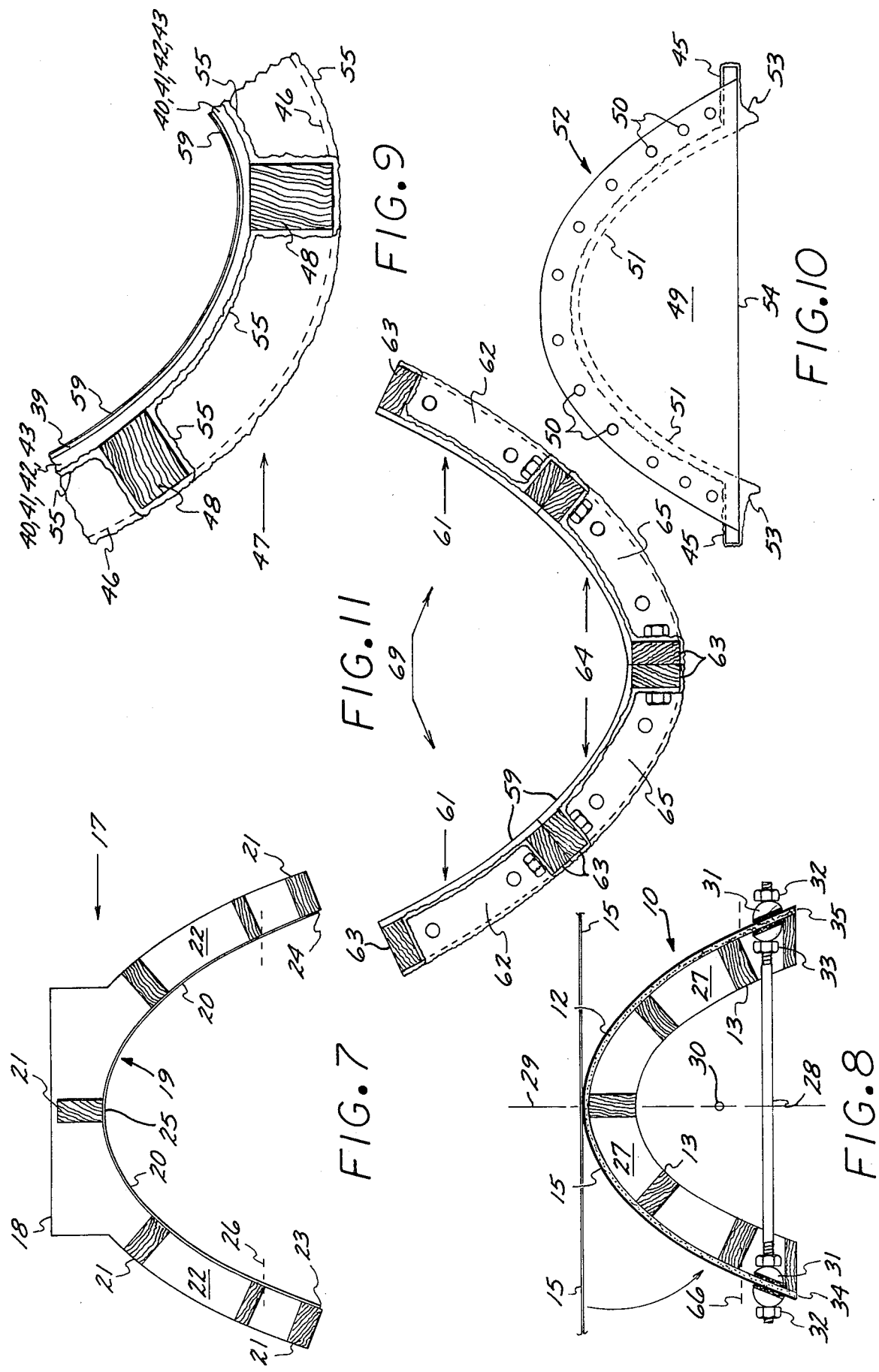

MANUFACTURE OF SOLAR REFLECTORS

FIELD OF THE INVENTION

The present invention relates to the manufacture of reflector troughs. Such a trough is used in reflecting solar energy to concentrate that energy on an energy absorption device extending linearly along the focus of the trough.

BACKGROUND OF THE INVENTION

In the past it has been found desireable to manufacture solar reflector troughs extending longitudinally in uniform cross section and having an interior concave surface formed in a parabolic configuration. Such reflector troughs are oriented to face the sun in order to receive solar radiation therefrom and reflect the sun's rays onto a solar energy absorption medium. Such a medium may assume the form of a conduit carrying circulating fluid. The conduit is located longitudinally along the trough at the parabolic focus. Reflected energy is thereby absorbed in the circulating fluid in the conduit and employed to advantage for a variety of purposes. The fluid may be used to carry thermal energy to create electricity, or may itself be distilled. Examples of the conventional manufacture and utilization of such reflectors are depicted in U.S. Pat. Nos. 1,946,184 and 3,959,056.

Problems have heretofore existed in the conventional manufacture of solar reflectors in that an adequate reflective surface has not heretofore been available which could be produced to economic advantage. An ideal reflector should be formed in a continuous concave focusing configuration with total reflectivity of sunlight and without surface irregularities that would cause difusion. Heretofore, several approaches have been attempted in an attempt to achieve a suitable reflector. Mirrors have been employed positioned in side by side relationship to approximate a parabolic surface. However, one such mirror construction involves the use of silvered or metal coated glass, in which there is a high degree of energy absorption. A great deal of solar energy is lost by energy absorption within the reflector itself. The degree of energy reflected to the energy absorption medium at the parabolic focus is thereby adversely effected.

An alternative parabolic reflective surface can be formed from highly polished sheets of metal, such as aluminum. Aluminum sheets can be formed into a parabolic configuration, but as with other forms of sheet metal, there is a tendency for a certain degree of waviness and surface undulations to persist despite careful contouring of the aluminum. Also, the necessary polishing of the aluminum is highly time consuming and expensive. The waviness in sheet aluminum is further aggravated by the weight of the metal sheet itself, which when stretched between supports, tends to sag. Stainless steel sheets suffer from the same deficiencies as polished aluminum sheets, and in addition are commercially unavailable in the requisite quality. In addition the thickness of sheet metal requires a much greater quantity of either aluminum or steel than is necessary with the technique of the present invention. Only a very small fraction of metal is required to produce the reflective coating of the present invention as contrasted with the use of a sheet metal reflector.

Mirrored plexiglass can be suitably formed in a parabolic configuration and is smooth enough to provide good reflectivity. However, the surface of plexiglass becomes degraded with continued atmospheric exposure and can not be adequately cleaned. Also, plastic, like glass, tends to absorb some of the solar energy within itself.

It is an object of the present invention to provide an improved reflective surface on a parabolic reflector for use in a solar collector at a reduced cost as compared with conventional techniques. The improved surface is provided by vacuum depositing an extremely thin coating of aluminum onto a parabolic support. The aluminum layer so deposited is preferably less than 0.001 inches in thickness so that only a small amount of solar energy is absorbed. Using a parabolic solar reflector formed according to the present invention, 92.0 percent of light energy received by the parabolic surfaced is reflected. Furthermore, vacuum depositing the aluminum layer may be performed much more economically than polishing a sheet aluminum surface.

An object of the invention in its preferred form is to provide a protective shielding for the reflective layer. This is achieved by vacuum depositing a thin layer of silcon dioxide or dipping the reflective layer in acrylic resin to create a protective coating on the thin aluminum coating previously vacuum deposited. This prevents degradation of the reflective properties of the parabolic reflecting surface which might otherwise result from exposure to the environment. By vacuum depositing the silicon dioxide, the protective layer can be made thin enough so as not to absorb energy to any significant degree.

A further object of the invention is to provide a supporting surface for the reflective aluminum layer which closely approaches perfect parabolic geometry. In conventional techniques of pouring or molding a substrate of plastic resin or other supporting material, curing of the resin or other substrate composition is accompanied by surface aberations which subsequently result in defusion of light received thereat. During curing, thermosetting plastic resin releases heat and tends to expand. With conventional molding and curing techniques, this leads to irregularities throughout the reflective surface. The effect, when viewed by microscope, is to create a diffuse surface or as "orange peel" surface, so called by reason of its microscopic resemblance to the texture of the outer surface of citrus fruit. Also both types of surface aberrations may be produced. A smooth surface is achieved according to the present invention by spraying a plurality of different layers of thermosetting resin onto an improved convex form in an number of different operations. Thus, curing of each thin sprayed layer proceeds to some extent before the application of the next layer. This improves the resultant surface conformity of the thermosetting resin sheet so formed to the exact parabolic configuration desired. Surface irregularities from expansion during curing are further reduced by utilizing fiberglass veils and chopped or shredded fiberglass roving. This reduces any tendency for the resin to run, and thereby vary in thickness on the convex form. A thickness variation in the resin affects the uniformity of rate of curing of the resin and creates surface irregularities as a result.

Surface irregularities due to expansion of the thermosetting resin in the support are further reduced by placing the edges of the convex mold under tension that tends to draw them toward each other. That is, the edges are pulled toward the principal axis of the parabolic configuration which aids in holding the parabolic shape of the reflector support as the fiberglass expands due to heat released during curing.

A further object of the invention is to provide an improved tool for forming parabolic solar reflectors. This is achieved by utilizing a convex mold in which a smooth surface film is supported on an underlying sheet arranged in a longitudinally extending configuration of parabolic cross section. Preferably, this smooth film is formed of plastic having a metallic chromium coating on the exterior surface thereof. The use of such a mold form enhances the exact conformity of the reflector surface to a configuration of precise parabolic cross section and minimizes diffusive irregularities in the reflective surface.

DESCRIPTION OF THE DRAWINGS

FIG. 7 illustrates a female forming device useful in constructing the tool of the invention.

FIG. 8 is a cross sectional view illustrating the construction of one embodiment of the tool of the invention.

FIG. 9 is an enlarged sectional view of a section of an embodiment of a linear parabolic trough produced according to the invention.

FIG. 10 is an end view illustrating another embodiment of a parabolic reflector manufactured according to the invention.

FIG. 11 illustrates another embodiment of a parabolic reflector produced according to the invention.

DETAILED DESCRIPTION OF THE INVENTION

Figure 1:
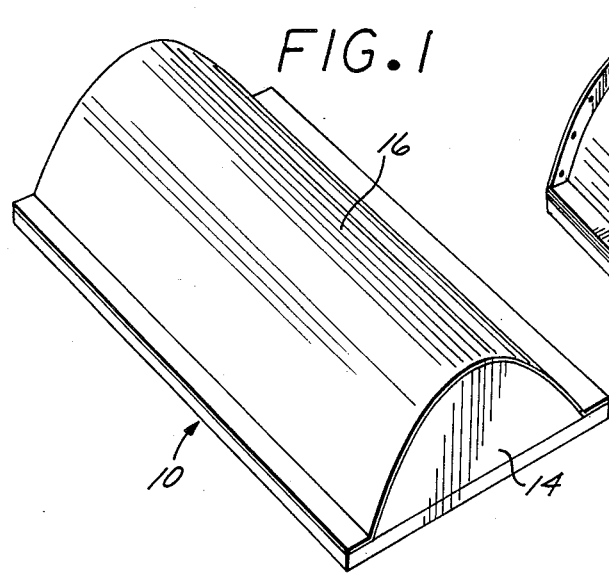
FIG. 1 is a perspective view of the upper convex parabolic surface of the tool for making solar reflectors.

Alternative embodiments of a tool 10 useful for making a parabolic reflector 11 for a solar energy collection system are illustrated in FIGS. 1 and 8. The tool 10 in FIG. 1 is used to make two reflectors concurrently longitudinally displaced from each other by the central arcuate rib 44. Both versions of the tool 10 include a configured sheet 12 extending in a longitudinal expansive uniform parabolic cross sectional configuration. Underlying structural supports 13 are provided and extend longitudinally along the concave surface formed by the configured parabolic sheet 12. The structural supports 13 are linear wooden members spaced to provide rigidity to the sheet 12. Planar end panels 14 define a parabolic surface conforming to the shape of the sheet 12 and provide further rigidity. A smooth surface film 15 is externally supported on the configured sheet 12 and secured thereto to provide a longitudinally expansive uniform smooth convex surface 16 of parabolic cross section.

Figure 2:
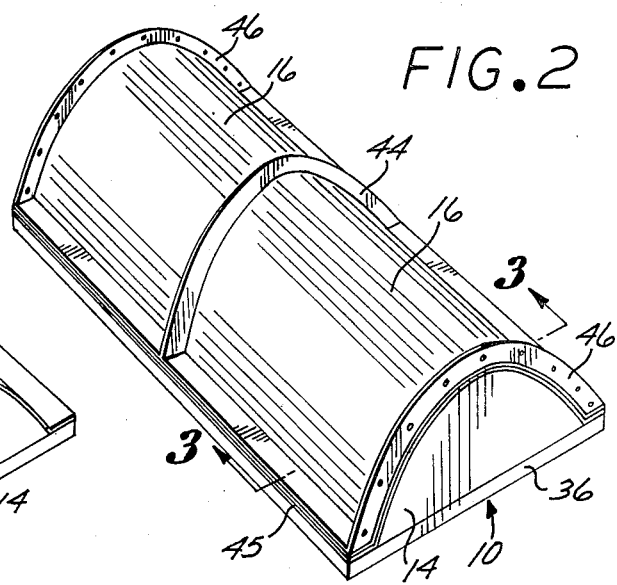
FIG. 2 is a perspective view of the tool of FIG. 1 after attachment thereon of a dividing framework to facilitate the manufacture of solar reflectors for tandem positioning.

After the sheet 12 with the film 15 has been positioned in place, a framework having longitudinally extending ribs 45 and an arcuate dividing rib 44 and arcuate retaining ribs 46 is positioned thereon, as depicted in FIG. 2. This framework serves to delineate two reflector supports to be produced on the form 10 and aids in providing these supports with the necessary edge flanges 70 and support rims 71, hereinafter to be described.

To construct the tool 10, a female mold or model 17 having a longitudinally extending parabolic recess 19 therein is utilized. The form 17 includes an appropriately sized sheet of mirror finished stainless steel 20 shaped in a parabolic configuration and bonded to lateral ribs 21 with evenly spaced parabolic transverse or arcuate ribs 22. The arcuate ribs 22 restrict the shape of the planar stainless steel sheet 20. Sheet 20 is connected by fasteners such as nails or screws along the extremities 23 and 24 of the ribs 21 and 22 remote from the vertex 25 of the parabolic configuration of the stainless steel sheet 20. The extremities 23 and 24 lie outside of the area of maximum use of the stainless steel sheet 20. This is the area lying between the vertex 25 and the maximum use line 26 marks the lowermost part of the master tool 17 which influences the shape of the final parabolic trough. Once formed, the model 17 is inverted to rest on a horizontal support on the flat base surface 18 of the parabolic transverse ribs 22.

To construct the male forming tool 10 of the invention, a thin tough epoxy polyamid gelcoat is sprayed onto the parabolic mirror finished stainless steel sheet 20 of model 17, which is inverted from the position depicted in FIG. 7. After the gelcoat layer has been applied, an industrial standard grade of fiberglass resin mixed with chopped roving is sprayed onto the coated stainless steel sheet 20 in relatively thin layers to prevent exotherm warpage. Once cured, these layers collectively form the configured sheet 12 of parabolic cross section depicted in FIGS. 3 and 8. Prior to curing, however, a support matrix comprised of internal lateral ribs 13 and internal semi-parabolic transverse ribs 27 are pressed into the uncured sheet 12 to stabilize the parabolic configuration of the sheet 12 after curing. The ribs 13 and 27 are fastened in place by spraying a subsequent fiberglass retainer layer onto the concave surface of the sheet 12. This encapsulates the support matrix including the ribs 13 and 27 and bonds the support matrix to the sheet 12.

With the embodiment of FIG. 8, minor distortions which occur as the male forming tool 10 cures are corrected after parting at the gelcoat layer from master female mold 17 by means of multiple threaded adjustment rods 28 inserted through holes drilled through the sheet 12. These holes are drilled adjacent to transverse ribs 27 below the maximum use line 66. It should be noted that the maximum use line 66 extends perpendicular to the principal axis 29 of the parabolic configuration and encloses the focus 30 within the confined area between the line 26 and the outer parabolic surface of the sheet 12, as depicted in FIG. 8. By means of resilient surfaced contact washers 31 and compression nuts 32 on the outside and expansion nuts 33 on the inside, the skirts 34 and 35 of the sheet 12 may be widened or narrowed to distort the tool in the manner necessary to produce a perfect linear parabola in the parabolic reflector structure 11 to be produced. Such intentional distortion may also be introduced by slightly modifying the transverse ribs 22 of the model 17.

After curing and correction, a mirror finished planar film 15 is bent to form a smooth parabolic surface, and is secured to the sheet 12. Perferably, the film 15 is applied to the sheet 12 before the fiberglass sheet 12 has completely cured, so that no other adhesive is necessary in order to provide the forming tool 10 with a longitudinally expansive uniform smooth convex surface 16 of parabolic cross section. Preferably, the film 15 is a sheet of stainless steel or a sheet of plastic such as plexiglass, having a metallic chromium coating on the exterior surface thereof.

It is necessary for the exterior surface 16 of the film 15 to be extremely smooth and without surface irregularities that would lead to corresponding irregularities in a parabolic reflector trough 11 to be produced for use in a solar collector. Also, the tool 10 is normally constructed longer than is necessary, and is sawed off to an appropriate length before formation of a reflector trough 11 thereon.

Figure 3:
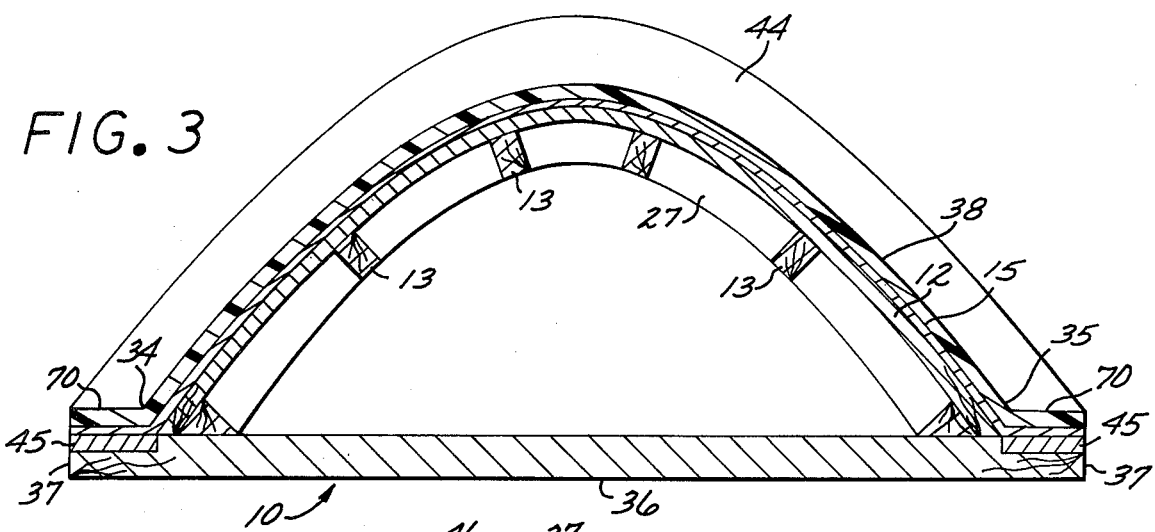
FIG. 3 is a cross sectional view taken along the lines 3—3 of FIG. 2 following the formation of reflector supports thereon.

The mold 10 may be glued or otherwise affixed to a wooden or metal base 36, as depicted in FIG. 3. Also, the male form 10 may be fitted with end pieces 14 having surfaces that conform to and support the interior surface of the sheet 12 and film 15. As in the embodiment of FIG. 3, the tool 10 can be formed with laterally extending ledges 37 positioned at the extremities of the skirts 34 and 35 of the sheet 12.

Figure 4:
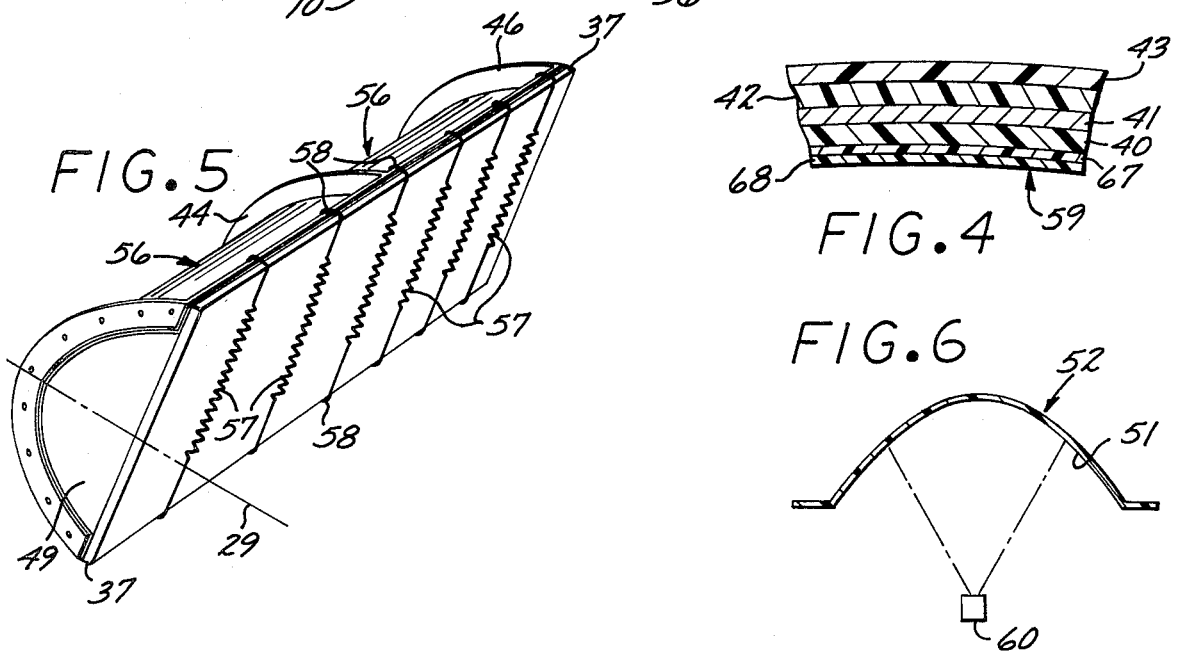
FIG. 4 is an enlarged sectional view depicting the layers in the finished parabolic reflector produced according to the invention.

To form two parabolic reflectors 11 on the tool 10 of FIG. 1, the surface 16 is sprayed with a resin release agent, such as a conventional gelcoat or wax release agent between the arcuate dividers 44 and 46. Thereafter, a plurality of layers of thermosetting resin indicated collectively at 38 in FIG. 3, are sprayed onto the form 10 in an uncured state in several different operations. The sequence of layers built up is depicted in FIG. 4, which illustrates a cross section of a finished parabolic reflector 11. A first heavy resin coat 40 is sprayed onto an optically smooth layer 16 of form 10 which may be plastic, such as plexiglass, with metallic chromium plated thereon. It has been found to be helpful in some instances to vibrate the form 10 during application of this layer to induce entrapped air bubbles to surface and leave the resin. This aids in eliminating "orange peel" or diffuse surface defects previously discussed. One suitable thermosetting resin that may be employed as the layer 40 is a 1:1 isophthalate resin. One such resin is manufactured by Cargill Corporation and is sold as resin number 8450. It is to be understood, however, that a wide variety of thermosetting resins are available for this purpose. Virtually any of the reinforced plastics may be employed, including epoxies, polyesters, phenolics, polyimides, polybenzin-idazoles and diallyl phthalates.

On top of the heavy resin coat 40, a two pound fiberglass veil or mesh 41 is positioned after the resin coat 40 has cured. Then a second resin coat 42 is applied over the veil 41. The resin 42 may be the same isophthalate resin. The resin coat 42 is allowed to at least partially cure, and a third resin coat 43 of the same isophthalate resin intermixed with chopped glass roving is sprayed over the layer 42.

The aggregate thickness of layers 40, 41, 42 and 43 is about one quarter inch in thickness.

In an alternative embodiment, one half inch fiberglass duct wrap is positioned on top of the second resin layer 42 prior to the sprayed application of the resin layer 43. The use of such a duct wrap provides for additional structural stablity of the parabolic reflector 11 so produced. The aggregate thickness of the layers 40, 41, 42 and 43 with the fiberglass duct wrap between layers 42 and 43 is about ¾ inches in thickness.

It should be noted that the embodiment of the reflector trough 47 produced in FIG. 9 differs from the embodiment 11 of FIGS. 3 and 10 in that intermediate longitudinal supports 48 are provided in addition to the longitudinal supports 70 formed in the reflector support structure by the longitudinal ribs 45 adjacent to the edges of the reflector support structure remote from the parabolic vertex.

The ends of the reflector support structure are equipped with planar end pieces 49, depicted for example in FIG. 10. To facilitate attachment of the end pieces 49, the arcuate ribs 44 and 46 of the framework positioned on the mold 10 are located adjacent to and just inside of the desired cut line for trimming to length at each end of the reflector trough 11 or 47. After curing, the trough is rough sawed to length and the retaining fiberglass 55 on the outside of the outermost transverse rims 71 formed on the reflector support structure by arcuate ribs 44 and 46 is ground to a smooth surface, which is drilled to match fastener holes 50 in formed end pieces 49 shown in FIG. 10. The end pieces 49 are normal to the concave parabolic surface 51 formed to create the reflector support structure 52 depicted in FIG. 10. The drilled holes 50 in the end pieces 49 may be specially fitted with pivot stubs, apertures or other mounting accessories required to support the entire linear parabolic trough 11 or 47. After final curing, sawing to length, grinding flat, and mounting of the formed ends 49, excess fiberglass overhang indicated along the outermost longitudinal supports 70 at 53 is rough sawn and ground flat so that the flats create a single plane with the flat edges 54 of formed ends 49. The entire reflector support structure 52 so formed may then be removed from the parabolic convex surface 16 of form 10.

Figure 5:
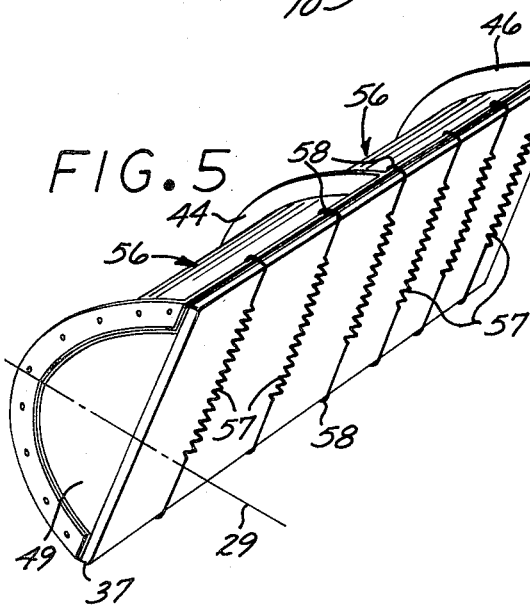
FIG. 5 is a perspective view of a parabolic reflector during an intermediate stage of manufacture.

Prior to fully curing the resin layers indicated collectively at 38 in FIG. 3, however, it may be desireable to mount the end pieces 49 and effectuate curing of the resin in a particular manner as depicted in FIG. 5. Specifically, before the thermosetting resin cures, the end pieces 49 are mounted in place as indicated against the wet resin. Spring biasing devices 57, in the form of elastically deformable members, such as the coil springs depicted, are positioned under tension in spaced displacement from each other as indicated. That is, the springs 57 are positioned longitudinally along the reflector support structure 56 in mutually parallel alignment with respect to the principal axis 29 of the parabolic configuration of the structure. Hooks 58 at the ends of the springs 57 are secured about the ledges 37 formed by the longitudinal supports 45 and the sheet 12 at skirts 34 and 35 thereof. The coil springs 57 are thereby placed under tension that tends to draw the opposing skirts 34 and 35 of the sheet 12 and the ledges 37 towards each other. If this is done prior to fully curing the layers of thermosetting resin on the structure 56, the tensile force imposed by the springs 57 tends to constrain the expansion of the resin during curing, yet is not so restrictive as to cause surface irregularities. The structure 56 is urged by the springs 57 to retain its parabolic configuration. The spring constant of the springs 57 is chosen so as not to be so great as to create surface disruptions resulting in the "orange peel" effect previously mentioned.

After the reflector support structure 56 has fully cured, it is removed from the mold 10 and moved to a vacuum chamber which is sealed and then evacuated so that a mirror surface 59 may be applied to the concave parabolic surface 51 of the reflector support structure. The mirror surface 59 is formed by vacuum depositing liquid metallic aluminum onto the exposed parabolic concave surface 51 of the reflector support structure 52 to form a reflective layer 67, depicted in FIG. 4. Liquid aluminum in small containers 60 is evaporated onto the surface 51 to a thickness which is opaque to all infra-red wave lengths stopped by metallic aluminum. Preferably, the thickness of this layer 67 of vacuum deposited aluminum is no greater than 0.001 inches and the most desirable thickness has been found to be about 30 angstroms.

To effecuate vacuum depositing, the reflector support structure 52 is position in a vacuum chamber above several small containers 60 called boats, positioned lengthwise along the parabolic surface, each containing a quantity of aluminum metal melted and vaporized by a resistance heater or an election beam. The chamber is evacuated to a pressure of about $10^{-5}$ inches of mercury. The melted aluminum will then sublimate and create a coated layer 67 on the concave parabolic surface 51 of the reflector support structure 52. At a pressure of $10^{-5}$ inches of mercury, only about 2 minutes are required to coat a trough in which the longitudinal frame ribs 45 are about 10 feet long and 5½ feet apart.

Figure 6:
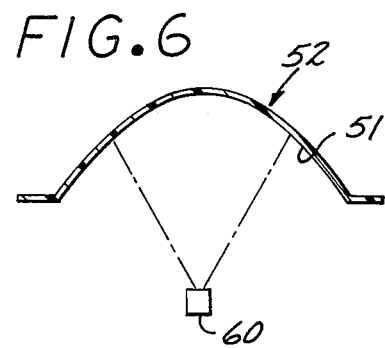
FIG. 6 is a diagrammatic view illustrating the step of vacuum depositing according to the invention.

To aid in the prevention of surface oxidation, a layer 68 of silicon dioxide is thereafter vacuum deposited onto the aluminum coated parabolic surface. Vacuum depositing is carried out in the same manner as is the vacuum depositing of aluminum. The silicon dioxide layer is essentially a mono-molecular layer, as its only function is to prevent the degradation of the aluminum layer 66 of the reflective coating 59 deposited by the vacuum depositing process depicted in FIG. 6.

An alternative protective layer 68 can be formed by dipping the entire trough 11 into a vat of acrylic resin or spraying acrylic resin onto the reflective coating layer 66. This would be faster and less expensive than vacuum depositing silicon dioxide, and would reduce the vacuum chamber time required. Once acrylic resin which could be used for this purpose is sold by E. I. Dupont De Nemours Co., Inc. as No. 6014 Elvacite Acrylic resin.

A further variation of the process is depicted in FIG. 11. The application of the process of the invention is not confined to the creation of a single length of a complete linear parabola, but instead, as depicted in FIG. 11, a reflector support structure 69 can be constructed in segments. The outer segments 61, complete with arcuate ribs 62 and longitudinal supports 63 could be created with one set of tooling. The inner segments 64 could then be created from a second set of tooling, complete with different arcuate supports 65 and with longitudinal supports 63. The segments 61 and 64 could then be bolted together in the manner depicted to form the complete composite parabolic trough 69. Alternatively segments of different configuration could be employed to create troughs or reflectors of non-parabolic cross section. For example, troughs of overlapping parabolic cross section, octagonal and circular cross section can be produced. Troughs of multiple focal points can also be manufactured.

In any event each segment could terminate in transverse ribs 62 or 65 to which additional lengths might be fastened to create structures of an extended length which could not fit within a known vacuum chamber for mirror coating. Thus, although there is a single linear demarkation in the reflective surface 59 separating adjoining segments, the reflective surface 59 within each segment can be formed without surface irregularities in the manner previously described. Thus, a highly effective parabolic reflector of virtually unlimited length can be created for use in collecting solar energy.

From the foregoing steps and embodiments explained and depicted, various modifications and variations of the invention will occur to those skilled in the art. Accordingly, the invention should not be construed as limited to the specific embodiments disclosed nor the precise conditions for carrying out the steps of the invention suggested. Rather the invention is defined in the claims appended hereto.

I claim:

1. A method of making a reflector specular to infra-red solar radiation for a solar energy collector system using a female mold having therein a longitudinally extending parabolic recess with a structurally reinforced mirror finished surface, and constructing a male mold from said female mold, the steps comprising
    (a) spraying a thin, tough, epoxy polyamid gelcoat onto said mirror finished surface;
    (b) applying fiberglass resin mixed with chopped roving onto said coated mirror finished surface in thin layers to prevent exotherm warpage;
    (c) structurally supporting said applied layers to stabilize a convex parabolic configuration on the convex surface thereof;
    (d) applying a fiberglass retainer layer over said structurally supported layers of fiberglass resin mixed with chopped roving;
    (e) at least partially curing said structure and removing it from said female mold;
    (f) attaching transversely extending adjustable spacing means between opposing portions of said convex parabolic configuration at locations remote from the directrix thereof;
    (g) adjusting said spacing means to correct for minor distortions in said parabolic configuration;
    (h) bending a smooth, mirror finished planar film free of surface irregularities across said parabolic configuration and securing it thereto to form a longitudinally extending smooth rigid convex surface of precise parabolic cross section throughout, thereby completing said male mold, and thereafter:
    (i) spraying said rigid convex surface with a resin release agent;
    (j) spraying thereover in an uncured state and in a plurality of different operations a plurality of layers of thermosetting resin to form a reflector support structure;
    (k) removing the longitudinally extending parabolic trough reflector support structure so formed from said convex surface;
    (l) vacuum depositing aluminum onto the exposed concave surface of said reflector support structure to a thickness opaque to infra-red solar radiation and no greater than 0.001 inches; and
    (m) closing the ends of said reflector support structure with structure utilizing planar end pieces oriented normal to the concave surface formed in the reflector support structure.

2. The method of claim 1 further comprising positioning a plurality of reflector support structures in end to end relationship to create a reflector of extended length equal to the length of a plural number of reflector support structures formed as aforesaid.

3. The method of claim 1 further characterized in that the step of vacuum depositing is carried out at a pressure of about $10^{-5}$ inches of mercury.

4. The method of claim 1 further comprising, following the step of vacuum depositing aluminum, the step of vacuum depositing onto said aluminum coated concave surface a layer of silicon dioxide to aid in the prevention of surface oxidation.

5. The method of claim 1 further comprising, following the step of vacuum depositing aluminum, the step of applying an acrylic resin layer onto said aluminum coated concave surface to aid in the prevention of surface oxidation.

6. The method of claim 1 further characterized in that said step of spraying a plurality of layers of thermosetting resin on said rigid convex surface to form a reflector support structure further comprises spraying a first heavy resin coat on said rigid convex surface, applying thereover a second resin coat, at least partially curing said second resin coat, and applying thereover a third resin coat intermixed with chopped glass roving.

7. The method of claim 1 wherein said step of spraying a plurality of layers of thermosetting resin on said rigid convex surface to form a reflector support structure, further comprises spraying a first heavy resin coat on said convex surface, applying thereover a fiberglass veil, at least partially curing said heavy resin coat, applying thereover a second resin coat, at least partially curing said second resin coat, applying thereover a layer of fiberglass duct wrap, and applying thereover a third resin coat intermixed with chopped glass roving.

8. The method of claim 1 further comprising selecting an isophthalate as said thermosetting resin.

9. The method of claim 1 further comprising interposing spring biasing means between opposing surfaces of the reflector support structure at edges thereof tending to draw said edges toward each other prior to fully curing said layers of thermosetting resin on said convex surface.

10. The method claim 9 further comprising placing a plurality of elastically deformable members positioned under tension in spaced displacement from each other longitudinally along said reflector support structure in mutually parallel alignment.

11. The method of claim 10 further comprising selecting coil springs as said elastically deformable members.

* * * * *